(12) United States Patent
Wang et al.

(10) Patent No.: US 7,153,576 B2
(45) Date of Patent: Dec. 26, 2006

(54) WEATHERABLE MULTILAYER ARTICLE ASSEMBLIES AND METHOD FOR THEIR PREPARATION

(75) Inventors: Hua Wang, Clifton Park, NY (US); Joseph Anthony Suriano, Clifton Park, NY (US); Chetan Jayantilal Parikh, Newburgh, IN (US); Randall Todd Myers, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/761,714

(22) Filed: Jan. 20, 2004

(65) Prior Publication Data

US 2005/0158554 A1 Jul. 21, 2005

(51) Int. Cl.
 *B32B 27/36* (2006.01)
(52) U.S. Cl. ............... 428/412; 428/212; 428/426; 428/423.1; 428/457
(58) Field of Classification Search ............ 428/212, 428/412, 426, 423.1, 457; 264/165, 176.1, 264/219
See application file for complete search history.

(56) References Cited

U.S. PATENT DOCUMENTS

| | | | |
|---|---|---|---|
| 3,030,331 A | 4/1962 | Goldberg | |
| 3,169,121 A | 2/1965 | Goldberg | |
| 3,207,814 A | 9/1965 | Goldberg | |
| 3,309,261 A | 3/1967 | Schiller et al. | 161/190 |
| 3,391,054 A | 7/1968 | Lewis et al. | 161/186 |
| 3,444,129 A | 5/1969 | Young, Jr. et al. | |
| 3,444,412 A | 5/1969 | De Haan et al. | 313/65 |
| 3,460,961 A | 8/1969 | Young, Jr. et al. | |
| 3,492,261 A | 1/1970 | Young, Jr. et al. | |
| 3,503,779 A | 3/1970 | Young, Jr. et al. | |
| 3,505,160 A | 4/1970 | Michael et al. | 161/147 |
| 3,506,470 A | 4/1970 | Young, Jr. et al. | 117/33.3 |
| 3,764,457 A | 10/1973 | Chang et al. | 161/183 |
| 3,791,914 A | 2/1974 | Ammons et al. | 161/190 |
| 3,806,486 A | 4/1974 | Endriss et al. | 260/31.2 |
| 3,892,717 A | 7/1975 | Mori et al. | 260/78.4 |
| 3,965,057 A | 6/1976 | Ammons et al. | |
| 4,121,014 A | 10/1978 | Shaffer | 428/412 |
| 4,127,560 A | 11/1978 | Kramer | 528/273 |
| 4,150,217 A | 4/1979 | Noonan et al. | 528/290 |
| 4,156,069 A | 5/1979 | Prevorsek et al. | |
| 4,194,038 A | 3/1980 | Baker et al. | |
| 4,217,438 A | 8/1980 | Brunelle et al. | |
| 4,238,596 A | 12/1980 | Quinn | |
| 4,238,597 A | 12/1980 | Markezich et al. | |
| 4,281,099 A | 7/1981 | Maresca | 528/176 |
| 4,291,085 A | 9/1981 | Ito et al. | 428/215 |
| 4,334,053 A | 6/1982 | Freitag et al. | 528/179 |
| 4,414,230 A | 11/1983 | Hanabata et al. | 426/106 |
| 4,487,896 A | 12/1984 | Mark et al. | |
| 4,495,325 A | 1/1985 | DeBergalis et al. | 524/507 |
| 4,503,121 A | 3/1985 | Robeson et al. | |
| 4,506,065 A | 3/1985 | Miller et al. | |
| 4,576,842 A | 3/1986 | Hartsing et al. | |
| 4,643,937 A | 2/1987 | Dickinson et al. | |
| 4,914,143 A | 4/1990 | Patel | 522/148 |
| 4,931,364 A | 6/1990 | Dickinson | |
| 4,992,322 A | 2/1991 | Curry et al. | |
| 5,001,000 A | 3/1991 | Rohrbacher et al. | |
| 5,001,193 A | 3/1991 | Golden | 525/109 |
| 5,030,505 A | 7/1991 | Dickinson | |
| 5,064,704 A | 11/1991 | Stewart | 428/98 |
| 5,098,778 A | 3/1992 | Minnick | 428/285 |
| 5,103,336 A | 4/1992 | Sieloff | 359/253 |
| 5,262,475 A | 11/1993 | Creasy | 525/58 |
| 5,318,850 A | 6/1994 | Pickett et al. | 428/412 |
| 5,321,114 A | 6/1994 | Fontana et al. | 528/179 |
| 5,360,647 A | 11/1994 | Sumida | 428/1 |
| 5,364,669 A | 11/1994 | Sumida et al. | 428/1 |
| 5,407,751 A | 4/1995 | Genske et al. | 428/516 |
| 5,446,767 A | 8/1995 | Nakagawa et al. | 375/376 |
| 5,486,407 A | 1/1996 | Noell et al. | 428/215 |
| 5,510,182 A | 4/1996 | Fontana et al. | 428/35.7 |
| 5,552,463 A | 9/1996 | Akkapeddi et al. | 524/98 |
| 5,601,679 A | 2/1997 | Mulcahy et al. | 156/242 |
| 5,738,918 A | 4/1998 | Shen et al. | 428/1 |
| 5,759,689 A | 6/1998 | Sieloff | 428/412 |
| 5,846,659 A | 12/1998 | Lower et al. | 428/412 |
| 5,885,668 A | 3/1999 | Culbertson et al. | 428/1 |
| 5,916,997 A | 6/1999 | Webb et al. | 528/194 |

(Continued)

FOREIGN PATENT DOCUMENTS

DE 101 00 745 1/2001

(Continued)

OTHER PUBLICATIONS

S. M. Cohen et al., "*Transparent Ultraviolet-Barrier Coatings*", Journal of Polymer Science, Part A-1, vol. 9, pp. 3263-3299, 1971.

(Continued)

*Primary Examiner*—Terressa Boykin
(74) *Attorney, Agent, or Firm*—Cantor Colburn LLP

(57) ABSTRACT

Disclosed is a multilayer article assembly comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive layer comprising a polyurethane, and (iv) an uncured thermoset or uncured cyclic oligomer substrate layer, wherein the coating layer is in contiguous contact with the second layer, and the adhesive layer is in contiguous contact with the second layer and the substrate layer. Also disclosed is a method for preparing said multilayer article assembly.

56 Claims, No Drawings

U.S. PATENT DOCUMENTS

| | | | |
|---|---|---|---|
| 6,087,007 A | 7/2000 | Fujii et al. | 428/412 |
| 6,136,441 A | 10/2000 | MacGregor et al. | 428/412 |
| 6,143,839 A | 11/2000 | Webb et al. | 525/439 |
| 6,180,195 B1 | 1/2001 | Ellison et al. | 428/31 |
| 6,265,522 B1 | 7/2001 | Brunelle et al. | 528/194 |
| 6,291,589 B1 | 9/2001 | Brunelle et al. | 525/165 |
| 6,294,647 B1 | 9/2001 | Brunelle et al. | 528/486 |
| 6,297,300 B1 | 10/2001 | Van Nuffel | 524/91 |
| 6,306,507 B1 | 10/2001 | Brunelle et al. | |
| 6,395,823 B1 * | 5/2002 | Brink et al. | 524/539 |
| 6,538,065 B1 | 3/2003 | Suriano et al. | |
| 6,572,956 B1 | 6/2003 | Pickett et al. | |
| 6,586,091 B1 | 7/2003 | Iijima et al. | 428/355 |
| 6,607,814 B1 | 8/2003 | Pickett et al. | 428/212 |
| 6,617,398 B1 | 9/2003 | Yeager et al. | |
| 2002/0028337 A1 | 3/2002 | Yeager et al. | 428/461 |
| 2003/0175488 A1 * | 9/2003 | Asthana et al. | 428/212 |
| 2004/0028907 A1 | 2/2004 | Wang | |
| 2004/0142176 A1 * | 7/2004 | Wang | 428/412 |
| 2004/0166323 A1 * | 8/2004 | Wang | 428/412 |
| 2005/0003208 A1 * | 1/2005 | Graf et al. | 428/426 |

FOREIGN PATENT DOCUMENTS

| | | |
|---|---|---|
| EP | 0 277 350 A1 | 10/1988 |
| EP | 0733470 | 9/1994 |
| EP | 1124878 | 7/1999 |
| JP | 1/199841 | 8/1989 |
| WO | WO 00/26274 | 5/2000 |
| WO | WO 00/26275 | 5/2000 |
| WO | WO/00/61664 | 10/2000 |
| WO | WO 00/69945 | 11/2000 |

OTHER PUBLICATIONS

Irving Skeist, "*Handbook of Adhesives*", Van Nostrand Reinhold, New York, Third Edition (1990), pp. 359-380.

A. Pizzi et al., "*Handbook of Adhesive Technology*", Marcel Dekker, Inc., New York—Basel—Hong Kong, pp. 405-429 (1994).

U.S. Appl. No. 10/371,755, filed Feb. 21, 2003.

U.S. Appl. No. 10/461,005, filed Jun. 12, 2003.

U.S. Appl. No. 10/760,826, filed Jan. 16, 2004.

U.S. Appl. No. 10/210,746, filed Jul. 31, 2002.

Rossitto, Conrad, "Polyester and Polyamide High Performance Hot Melt Adhesives", Handbook of Adhesives 3rd Edition, Edited by Irving Skeist, Van Nostrand Reinhold Publishers, Chapter 28, pp. 478-498, 1990.

JP1201326. Publication Date Aug. 14, 1989. "Polyester Molding Material and Molding" (Abstract Only).

JP6122756. Publication Date May 6, 1994. "Aromatic Polyester and its Preparation" (Abstract Only).

International Search Report for PCT/US 02/27751. Date Mailed Dec. 19, 2002.

International Search Report; International Application No. PCT/US 2005/000093; International Filing Date: Apr. 1, 2005; 3 pages.

International Search Report; International Application No. PCT/US 2004/018521; 2 pages.

\* cited by examiner

WEATHERABLE MULTILAYER ARTICLE ASSEMBLIES AND METHOD FOR THEIR PREPARATION

BACKGROUND OF THE INVENTION

The present invention relates to weatherable multilayer resinous article assemblies and their preparation. More particularly, it relates to multilayer resinous article assemblies comprising a protective block copolyestercarbonate coating, a second layer comprising a polymer comprising carbonate structural units, an uncured thermoset or uncured cyclic oligomer substrate layer, and at least one adhesive layer between the second layer and the substrate. The said multilayer article assemblies may be further processed into weatherable multilayer resinous articles by curing.

Various resinous articles have a problem of long term color instability. This causes yellowing of the polymer resin, which in some embodiments detracts from its transparency and attractiveness. Loss of gloss can also be an undesirable long term phenomenon.

Yellowing of polymers is often caused by the action of ultraviolet radiation, which is why such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature. Such levels may be inadequate to afford sufficient protection.

One way of protecting a resinous article against photoyellowing and loss of gloss is to apply a coating of a weatherable second polymer, the term "weatherable" as used herein signifying resistance to such phenomena. Weatherable polymers suitable for this purpose include resorcinol isophthalate/terephthalate copolyarylates. This is the subject of Cohen et al., J. Poly. Sci., Part A-1, 9, 3263–3299 (1971), and certain related U.S. Patents of Monsanto Company including Nos. 3,444,129, 3,460,961, 3,492,261 and 3,503,779. Commonly owned, published application WO 00-61664 is directed to weatherable multilayer articles with coating layers comprising structural units derived from a 1,3-dihydroxybenzene organodicarboxylate. Commonly owned U.S. Pat. No. 6,306,507 is directed to weatherable multilayer articles with coating layers comprising at least one coating layer thereon, said coating layer comprising a thermally stable polymer comprising resorcinol arylate polyester chain members substantially free of anhydride linkages linking at least two mers of the polymer chain, prepared by an interfacial method.

Japanese Kokai 1/199,841 discloses articles having a substrate layer comprising at least 90 mole percent poly (ethylene terephthalate) and a gas barrier coating layer which is a polyester of resorcinol and isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding which are essentially performed entirely in the melt, thereby overcoming the aforementioned deficiencies of solution coating. However, the only types of articles disclosed are bottles, which are produced from a co-injection molded parison by subsequent blow molding. Larger articles intended for outdoor use, such as external automobile body parts, are not disclosed and no method for their production is suggested, nor are articles in which the substrate layer is anything other than poly(ethylene terephthalate).

Commonly owned application Ser. No. 10/371,754, filed on Feb. 21, 2003, is directed to weatherable multilayer articles comprising in one embodiment a thermoset substrate layer and an adhesive layer comprising a polyurethane. However, any substrate layer derived from a thermoset resin must be cured before assembly of these multilayer articles. The requirement for curing any thermoset substrate layer before assembly increases the complexity of the process and the cost of the final multilayer article.

It remains of interest, therefore, to develop weatherable multilayer articles which are capable of use for such varied purposes as body parts for outdoor vehicles and devices such as automobiles, and which exhibit adequate adhesion between the various layers. Furthermore, there is a need to provide a multilayer article with well-adhered layers comprising a thermoset substrate, said article being made with improved efficiency.

BRIEF DESCRIPTION OF THE INVENTION

The present inventors have discovered an efficient method to prepare multilayer articles with coating layers which provide protection from weathering for underlying layers, and which exhibit excellent adhesion between the various layers. In one of its embodiments the present invention comprises a multilayer article assembly comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive layer comprising a polyurethane, and (iv) an uncured thermoset or uncured cyclic oligomer substrate layer, wherein the coating layer is in contiguous contact with the second layer, and the adhesive layer is in contiguous contact with the second layer and the substrate layer. In another of its embodiments the present invention comprises a method for preparing said multilayer article assembly.

Various other features, aspects, and advantages of the present invention will become more apparent with reference to the following description and appended claims.

DETAILED DESCRIPTION OF THE INVENTION

In the following specification and the claims which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. As used herein the term "layer" is used interchangeably with the terms "film" and "sheet". The terms "adhesive layer" and "tielayer" are used interchangeably.

The copolyestercarbonate film in the multilayer article assemblies of the present invention comprises at least one block copolyestercarbonate comprising alternating carbonate and arylate blocks. Such block copolyestercarbonates include polymers comprising 1,3-dihydroxybenzene structural units and aromatic dicarboxylic acid structural units of the Formula (I):

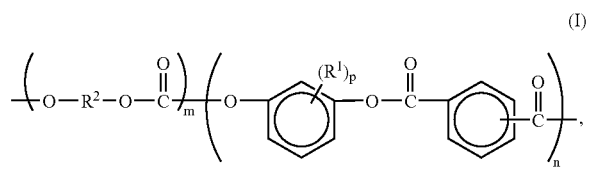

wherein each $R^1$ is independently halogen or $C_{1-12}$ alkyl, p is 0–3, each $R^2$ is independently a divalent organic radical, m is at least 1 and n is at least about 4. In some embodiments n is at least about 10, in other embodiments at least about 20 and in still other embodiments about 30–150. In some embodiments m is at least about 3, in other embodiments at least about 10 and in still other embodiments about 20–200. In other embodiments m is between about 20 and 50. Within the context of the invention "alternating carbonate and arylate blocks" means that the copolyestercarbonates comprise at least one carbonate block and at least one arylate block. In particular embodiments block copolyestercarbonates comprise at least one arylate block and at least two carbonate blocks. In another particular embodiment block copolyestercarbonates comprise an A-B-A architecture with at least one arylate block ("B") and at least two carbonate blocks ("A").

The arylate blocks contain structural units comprising 1,3-dihydroxybenzene moieties which may be unsubstituted or substituted. Alkyl substituents, if present, are often straight-chain or branched alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, nonyl, decyl, and aryl-substituted alkyl, including benzyl. In some embodiments any alkyl substituent is methyl. Suitable halogen substituents include bromo, chloro, and fluoro. 1,3-dihydroxybenzene moieties containing a mixture of alkyl and halogen substituents are also suitable. The value for p may be in one embodiment 0–3, in another embodiment 0–2, and in still another embodiment 0–1. In one embodiment a 1,3-dihydroxybenzene moiety is 2-methylresorcinol. In many embodiments a 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as isophthalate or terephthalate or their halogen-substituted derivatives; or polycyclic moieties, illustrative examples of which include biphenyl dicarboxylate, diphenylether dicarboxylate, diphenylsulfone dicarboxylate, diphenylketone dicarboxylate, diphenylsulfide dicarboxylate, or naphthalenedicarboxylate. In some embodiments polycyclic moieties comprise naphthalene-2,6-dicarboxylate; or mixtures of monocyclic and/or polycyclic aromatic dicarboxylates. In many embodiments the aromatic dicarboxylic acid moieties are isophthalate and/or terephthalate. Either or both of said moieties may be present. In one embodiment both are present in a molar ratio of isophthalate to terephthalate in the range of about 0.20–5.0:1, while in another embodiment both are present in a molar ratio of isophthalate to terephthalate in the range of about 0.25–4.0:1. When the isophthalate to terephthalate ratio is greater than about 4.0:1, then unacceptable levels of cyclic oligomer may form in some embodiments. When the isophthalate to terephthalate ratio is less than about 0.25:1, then unacceptable levels of insoluble polymer may form in some other embodiments. In some embodiments the molar ratio of isophthalate to terephthalate is about 0.40–2.5:1, and in other embodiments about 0.67–1.5:1.

In various embodiments the arylate block segments in the copolyestercarbonates are substantially free of anhydride linkages linking at least two mers of the polymer chain. Substantially free of anhydride linkages in the present context means that the copolyestercarbonates show decrease in molecular weight in some embodiments of less than 10% and in other embodiments of less than 5% upon heating said copolyestercarbonates at a temperature of about 280–290° C. for five minutes.

In the carbonate blocks of the copolyestercarbonates each $R^2$ of Formula (I) is independently an organic radical derived from a dihydroxy compound. For the most part, at least about 60 percent of the total number of $R^2$ groups in the polymer are aromatic organic radicals and the balance thereof are aliphatic, alicyclic, or aromatic radicals. Suitable $R^2$ radicals include, but are not limited to, m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438. In some embodiments of the invention dihydroxy compounds include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; hydroquinone, resorcinol; $C_{1-3}$ alkyl-substituted resorcinols. In a particular embodiment the dihydroxy compound comprises bisphenol A.

Suitable dihydroxy compounds also include those containing indane structural units such as represented by the Formula (II), which compound is 3-(4-hydroxyphenyl)-1,1, 3-trimethylindan-5-ol, and by the Formula (III), which compound is 1-(4-hydroxyphenyl)-1,3,3-trimethylindan-5-ol

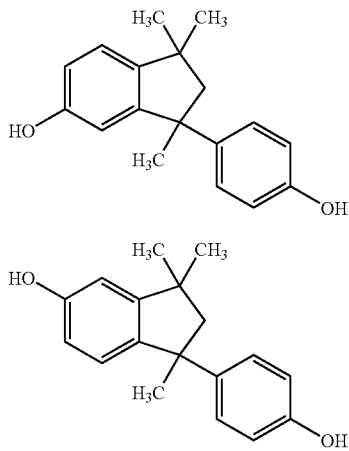

Included among suitable dihydroxy-substituted aromatic hydrocarbons are the 2,2,2',2'-tetrahydro-1,1'-spirobi[1H-indene]diols having Formula (IV):

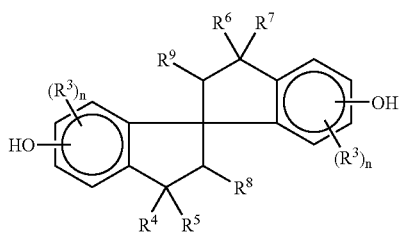

wherein each $R^3$ is independently selected from monovalent hydrocarbon radicals and halogen radicals; each $R^4$, $R^5$, $R^6$, and $R^7$ is independently $C_{1-6}$ alkyl; each $R^8$ and $R^9$ is independently H or $C_{1-6}$ alkyl; and each n is independently selected from positive integers having a value of from 0 to 3 inclusive. In a particular embodiment the 2,2,2',2'-tetrahydro-1,1'-spirobi [1H-indene]-diol is 2,2,2',2'-tetrahydro-3,3,3',3'-tetramethyl-1,1'-spirobi[1H-indene]-6,6'-diol (sometimes know as "SBI").

The term "alkyl" as used in the various embodiments of the present invention is intended to designate linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. Alkyl groups may be saturated or unsaturated, and may comprise, for example, vinyl and allyl. The term "alkyl" also encompasses that alkyl portion of alkoxide groups. In various embodiments normal and branched alkyl radicals are those containing from 1 to about 32 carbon atoms, and include as illustrative non-limiting examples $C_1$–$C_{32}$ alkyl optionally substituted with one or more groups selected from $C_1$–$C_{32}$ alkyl, $C_3$–$C_{15}$ cycloalkyl or aryl; and $C_3$–$C_{15}$ cycloalkyl optionally substituted with one or more groups selected from $C_1$–$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl or heteroaryl radicals containing from 6 to 18 ring carbon atoms. Some illustrative non-limiting examples of these aryl radicals include $C_6$–$C_{15}$ aryl optionally substituted with one or more groups selected from $C_1$–$C_{32}$ alkyl, $C_3$–$C_{15}$ cycloalkyl or aryl. Some particular illustrative examples of aryl radicals comprise substituted or unsubstituted phenyl, biphenyl, toluyl and naphthyl. Heteroaryl groups comprise those containing from about 3 to about 10 ring carbon atoms, and include, but are not limited to, triazinyl, pyrimidinyl, pyridinyl, furanyl, thiazolinyl and quinolinyl.

In some embodiments each $R^2$ is an aromatic organic radical and in particular embodiments a radical of the Formula (V):

$$-A^1-Y-A^2-, \qquad (V)$$

wherein each $A^1$ and $A^2$ is a monocyclic divalent aryl radical and Y is a bridging radical in which one or two carbon atoms separate $A^1$ and $A^2$. The free valence bonds in Formula (V) are usually in the meta or para positions of $A^1$ and $A^2$ in relation to Y. Compounds in which $R^2$ has Formula (V) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In Formula (V), $A^1$ and $A^2$ typically represent unsubstituted phenylene or substituted derivatives thereof, illustrative substituents (one or more) being alkyl, alkenyl, and halogen (particularly bromine). In many embodiments $A^1$ and $A^2$ represent unsubstituted phenylene radicals. Both $A^1$ and $A^2$ may be p-phenylene, although both may be o- or m-phenylene or one o- or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —C=O, —O—, —S—, —SO— or —$SO_2$—, methylene, cyclohexylmethylene, 2-[2.2.1]-bicycloheptylmethylene, ethylene, isopropylidene, neopentylidene, cyclohexylidene, cyclopentadecylidene, cyclododecylidene, and adamantylidene. In some embodiments such radicals are gem-alkylene radicals. Also included, however, are unsaturated radicals. For reasons of availability and particular suitability for the purposes of this invention a particular bisphenol is 2,2-bis (4-hydroxyphenyl)propane (hereinafter referred to as bisphenol A or BPA), in which Y is isopropylidene and $A^1$ and $A^2$ are each p-phenylene.

Depending upon whether or not any unreacted 1,3-dihydroxybenzene moiety is present in the reaction mixture as described hereinafter, $R^2$ in the carbonate blocks may consist of or at least partially comprise a radical derived from a 1,3-dihydroxybenzene moiety. Therefore, in one embodiment of the present invention the copolyestercarbonates comprise carbonate blocks with $R^2$ radicals derived from a dihydroxy compound identical to at least one 1,3-dihydroxybenzene moiety in the polyarylate blocks. In another embodiment the copolyestercarbonates comprise carbonate blocks with $R^2$ radicals derived from a dihydroxy compound different from any 1,3-dihydroxybenzene moiety in the polyarylate blocks. In yet another embodiment the copolyestercarbonates comprise carbonate blocks containing a mixture of $R^2$ radicals derived from dihydroxy compounds at least one of which is the same as and at least one of which is different from any 1,3-dihydroxybenzene moiety in the polyarylate blocks. When a mixture of $R^2$ radicals derived from dihydroxy compounds is present, then the molar ratio of dihydroxy compounds identical to those present in the polyarylate blocks to those dihydroxy compounds different from those present in the polyarylate blocks is typically about 1:999 to 999:1. In some particular embodiments the copolyestercarbonates comprise carbonate blocks containing a mixture of $R^2$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising arylate chain members and blocks comprising organic carbonate chain members typically comprise a carbonate linkage between a diphenol residue of an arylate moiety and a —(C=O)—O— moiety of an organic carbonate moiety, although other types of linkages such as ester and/or anhydride are also possible. A typical carbonate linkage between said blocks is shown in Formula (VI), wherein $R^1$ and p are as previously defined:

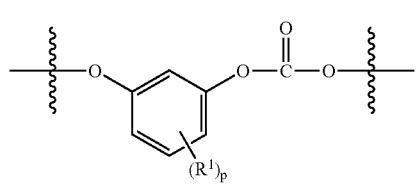
(VI)

In one embodiment the copolyestercarbonate is substantially comprised of a diblock copolymer with a carbonate linkage between an arylate block and an organic carbonate block. In another embodiment the copolyestercarbonate is substantially comprised of a triblock carbonate-ester-carbonate copolymer with carbonate linkages between the arylate block and organic carbonate end-blocks. Copolyestercarbonates with at least one carbonate linkage between an arylate block and an organic carbonate block are typically prepared from 1,3-dihydroxybenzene arylate-containing oligomers containing at least one and often two hydroxy-terminal sites (hereinafter sometimes referred to as hydroxy-terminated polyester intermediate).

In another embodiment the copolyestercarbonate comprises arylate blocks linked by carbonate linkages as shown in Formula (VII):

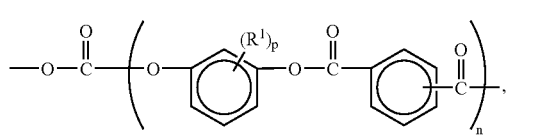
(VII)

wherein $R^1$, p, and n are as previously defined, and the arylate structural units are as described for Formula (I). Copolyestercarbonates comprising Formula (VII) may arise from reaction of hydroxy-terminated polyester intermediate with a carbonate precursor in the substantial absence of any dihydroxy compound different from the hydroxy-terminated polyester intermediate. In other embodiments the copolyestercarbonate may comprise a mixture of copolyestercarbonates with different structural units and different architectures, for example as described herein.

In the copolyestercarbonates suitable for use in the present invention the distribution of the blocks may be such as to provide a copolymer having any desired weight proportion of arylate blocks in relation to carbonate blocks. The copolyestercarbonates contain in one embodiment about 5% to about 99% by weight arylate blocks; in another embodiment about 20% to about 98% by weight arylate blocks; in another embodiment about 40% to about 98% by weight arylate blocks; in another embodiment about 60% to about 98% by weight arylate blocks; in another embodiment about 80% to about 96% by weight arylate blocks; and in still another embodiment about 85% to about 95% by weight arylate blocks.

The copolyestercarbonate film can comprise other components such art-recognized additives including, but not limited to, stabilizers, color stabilizers, heat stabilizers, light stabilizers, auxiliary UV screeners, auxiliary UV absorbers, flame retardants, anti-drip agents, flow aids, plasticizers, ester interchange inhibitors, antistatic agents, mold release agents, and colorants such as metal flakes, glass flakes and beads, ceramic particles, other polymer particles, dyes and pigments which may be organic, inorganic or organometallic. In a particular embodiment a copolyestercarbonate-comprising layer is substantially transparent.

The thickness of the coating layer is sufficient to provide protection of the underlying layers from weathering, in particular from the effects of UV radiation, as measured, for example, by retention of such properties as gloss and by color stability in any colorant-comprising layer. In one embodiment the thickness of the coating layer is in a range of about 2–2,500 microns, in another embodiment in a range of about 10–250 microns, and in another embodiment in a range of about 50–175 microns.

If desired, an overlayer may be included over the coating layer, for example to provide abrasion or scratch resistance. In a particular embodiment a silicone overlayer is provided over a copolyestercarbonate-comprising coating layer.

Multilayer article assemblies of the present invention comprise a second layer comprising a polymer comprising carbonate structural units. In one embodiment the polymer of the second layer comprises at least one homopolycarbonate. Any polycarbonate capable of being processed into a film or sheet is suitable. In various embodiments suitable polycarbonates comprise those with structural units derived from monomers selected from the group consisting of all those described above for use in the carbonate blocks of the block copolyestercarbonate. In particular embodiments polycarbonate film comprises bisphenol A homo- or copolycarbonates. In another particular embodiment polycarbonate film comprises bisphenol A homopolycarbonate. In other embodiments polycarbonate film comprises a blend of at least one first polycarbonate with at least one other polymeric resin, examples of which include, but are not limited to, a second polycarbonate differing from said first polycarbonate either in structural units or in molecular weight or in both these parameters, or a polyester, or an addition polymer such as acrylonitrile-butadiene-styrene copolymer or acrylonitrile-styrene-acrylate copolymer.

The second layer may comprise other components such art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, fillers, and colorants such as metal flakes, glass flakes and beads, ceramic particles, other polymer particles, dyes and pigments which may be organic, inorganic or organometallic. In a particular embodiment a second layer further comprises at least one colorant. In another particular embodiment a second layer comprises both a bisphenol A polycarbonate and at least one colorant selected from the group consisting of dyes, pigments, glass flakes, and metal flakes. In a particular embodiment metal flake comprises aluminum flake. In another particular embodiment metal flake comprises aluminum flake which has dimensions of about 20–70 microns. Further examples of colorants include, but are not limited to, Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, Lead Molybdates, Lead Chromates, Cerium Sulfides, Cadmium Sulfoselenide, and Cadmium Sulfide. Illustrative extending and reinforcing fillers include, but are not limited to, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers.

The thickness of the second layer is in one embodiment in a range of about 2–2,500 microns, in another embodiment in a range of about 10–1,000 microns, and in another embodiment in a range of about 50–600 microns. An adhesive layer may optionally be present between the copolyestercarbonate-comprising coating layer and the second layer comprising carbonate structural units. In various embodiments said optional adhesive layers comprise those known in the art which provide adhesion to a surface or layer comprising a polymer comprising carbonate structural units. In some embodiments said optional adhesive layer is transparent and in other embodiments said optional adhesive layer has the same color as the second layer.

In various embodiments polyurethanes suitable for use in the adhesive layer of multilayer article assemblies of the invention comprise those known in the art which provide adhesion to a surface or layer comprising a polymer comprising carbonate structural units. Polyurethane adhesives are described in many reference such as in Handbook of Adhesive Technology, edited by A. Pizzi and K. L. Mittal, Marcel Dekker, Inc., 1994, pages 405–429, and in Handbook of Adhesives, edited by I. Skeist, Van Nostrand Reinhold, third edition, 1990, pages 359–380. Polyurethane adhesives typically comprise long polyol chains that are tied together by shorter hard segments formed by diisocyanate and chain extenders, if present. The polyol chains are typically referred to as soft segments which impart low-temperature flexibility and room-temperature elastomeric properties. Generally, the higher the soft segment concentration, the lower will be the modulus, tensile strength, and hardness, while elongation will increase. In some embodiments polyols for polyurethane adhesives comprise at least one polyol from at least one of three categories: polyether polyols, polyester polyols, and polyalkylene polyols including, but not limited to, polyols based on polybutadiene. In particular embodiment polyurethane adhesives comprise polyether polyols. In another particular embodiment polyurethane adhesives comprise a mixture of at least one polyether polyol and at least one polyester polyol. In some particular embodiments polyols comprise polytetramethylene ether glycol or hexamethylene glycol.

In particular embodiments suitable polyurethane adhesives include either one-component or two-component adhesive formulations. In particular embodiments suitable polyurethane adhesives include two-component adhesives which typically comprise a low-equivalent-weight isocyanate or isocyanate prepolymer that is cured with at least one of a low-equivalent-weight polyol or polyamine. In some embodiments suitable two-component adhesives comprise a first component with structural units derived from MDI (methylene diphenyl diisocyanate) and a second component comprising mixtures of amines and hydroxy-containing compounds. In other embodiments suitable polyurethane adhesives comprise at least one component with structural units derived from methylene biscyclohexyl diisocyanate. The two-component adhesive may further comprise at least one filler such as crystalline silica or quartz, or carbon black.

In other embodiments polyurethane adhesives comprise a copolymer comprising polyurethane structural units. In a particular embodiment the polyurethane adhesive comprises a block copolymer comprising a thermoplastic polyurethane block. In another particular embodiment the polyurethane adhesive comprises a block copolymer comprising a thermoplastic polyurethane block and at least one block comprising structural units derived from an alkenyl aromatic compound. In various embodiments suitable alkenyl aromatic compounds comprise styrene, alpha-methyl styrene, 2-methylstyrene, 3-methylstyrene, 4-methylstyrene, 2-t-butylstyrene, 3-t-butylstyrene, 4-t-butylstyrene, styrenes having from 1 to 5 halogen substituents on the aromatic ring, and the like, and combinations thereof. In a particular embodiment a suitable alkenyl aromatic compound is styrene. In another particular embodiment the polyurethane adhesive comprises a block copolymer comprising a thermoplastic polyurethane block and a styrene block copolymer (HSBC) block. The HSBC block may be a hydrogenated styrene-diene block copolymer comprising structural units derived from at least one diene such as butadiene, isoprene and the like. Illustrative examples of such block copolymers include those available from Kuraray Corporation under the designation TU S5865.

In other embodiments suitable polyurethane-comprising adhesives are in the form of film or sheet, which in various embodiments may be optically clear or transparent. In a particular embodiment a suitable polyurethane-comprising adhesive film is an aliphatic thermoplastic polyurethane film. In various embodiments suitable polyurethane film has a softening point in one embodiment in a range of between about 70° C. and about 200° C., and in another embodiment in a range of between about 80° C. and about 160° C.

In various embodiments the polyurethane-comprising adhesive layer thickness may be in a range of between about 8 microns and about 2500 microns; in other embodiments in a range of between about 25 microns and about 2000 microns; in other embodiments in a range of between about 50 microns and about 1500 microns; in other embodiments in a range of between about 100 microns and about 1300 microns; and in still other embodiments in a range of between about 500 microns and about 1300 microns. In some other embodiments polyurethane-comprising adhesive layer thickness may be in a range of between about 10 microns and about 650 microns; in other embodiments in a range of between about 25 microns and about 400 microns; and in still other embodiments in a range of between about 50 microns and about 260 microns.

In some embodiments of the present invention a polyurethane-comprising adhesive contains little or no free amine in the cured adhesive. Although the invention is not dependent upon any particular theory of operation, it is possible that amine groups may cause polycarbonate molecular weight degradation leading to deterioration in certain properties of the polycarbonate-comprising multilayer article. In some cases molecular weight degradation in the polycarbonate may result in decrease in adhesive strength under certain conditions such as after exposure to temperature-humidity cycle testing. In other embodiments a polyurethane-comprising adhesive further comprises additives known in the art including, but not limited to, adhesion promoters and tackifiers.

It is well known that mismatch between coefficients of thermal expansion (CTE) of a cap layer or coating layer and an underlying substrate may induce very high thermal stress and cause delamination in the final multilayer articles. In various embodiments the polyurethane-comprising adhesive layer can be formulated for applications with multilayer articles comprising said second layer and substrate layer with different coefficients of thermal expansion (CTE), for example, a high CTE second layer on a low CTE substrate. In various embodiments the polyurethane-comprising adhesive layer has a modulus at room temperature in one embodiment in a range of between about $10^5$ and about $10^9$ pascals and in another embodiment in a range of between about $10^6$ and $10^8$ pascals.

The substrate layer in the multilayer article assemblies of this invention comprises an uncured thermoset resin or uncured cyclic oligomer. In the present context an uncured thermoset resin or uncured cyclic oligomer includes those which are at least partially uncured. There is no particular limitation on the thickness of the substrate layer provided that a multilayer article comprising the uncured or cured substrate can be processed into a final desired form. A substrate layer may additionally comprise art-recognized additives including, but not limited to, colorants, pigments, dyes, impact modifiers, stabilizers, color stabilizers, heat stabilizers, light stabilizers, UV screeners, UV absorbers, flame retardants, anti-drip agents, fillers, flow aids, plasticizers, ester interchange inhibitors, antistatic agents, and mold release agents. In addition the substrate layer may optionally comprise a curing package to facilitate curing of the uncured substrate layer. Suitable curing packages are known in the art and may vary depending upon the identity of the uncured substrate material. Curing packages often comprise one or more of curing catalysts, curing agents, and initiators.

Suitable uncured thermoset resin substrates include, but are not limited to, epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, isocyanates. In one embodiment of the invention the thermoset polymer substrate comprises a RIM material. In another embodiment of the invention the thermoset polymer substrate further comprises at least one thermoplastic polymer, such as, but not limited to, polycarbonate, polyphenylene ether, polyphenylene sulfide, polysulfone, polyetherimide, polyamide or polyester.

Cyclic oligomers are well known in the art and may be obtained from such sources as Cyclics Corporation, Schenectady, N.Y. Said oligomers comprise polymeric structural units arranged in cyclic array with a degree of polymerization typically in the range of between about 2 and about 20. The cyclic oligomers upon curing undergo a ring-opening polymerization reaction to form a thermoplastic substrate. Suitable uncured cyclic oligomers include, but are not limited to, cyclic polyester oligomers, cyclic poly(butylene terephthalate) oligomers, cyclic poly(ethylene terephthalate) oligomers, cyclic polycarbonate oligomers, cyclic bisphenol A polycarbonate oligomers, cyclic polyetherimide oligomers and the like.

In one embodiment of the invention an uncured thermoset or uncured cyclic oligomer substrate layer also incorporates at least one filler and/or colorant. Illustrative extending and reinforcing fillers, and colorants include silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In the present context a thermoplastic resin in powder or fiber form included in the substrate material may also be considered a filler. In some particular embodiments a substrate of the invention comprises a filled substrate layer selected from the group consisting of sheet-molding compound (SMC), vinyl ester SMC, bulk molding compound (BMC), thick molding compound (TMC), structural reaction injected molded compound (SRIM), and an acrylic ester-derived thermoset resin comprising a polyphenylene ether. Sheet molding compound (SMC) is a moldable composite material often comprising an unsaturated liquid polyester resin, a low profile thermoplastic resin, an inert filler, a curing aid, and short lengths of glass fiber reinforcing materials. Among illustrative fiberglass reinforced thermoset substrates suitable for use in the invention are those provided by Ashland Specialty Chemical, Dublin, Ohio, GenCorp, Marion, Ind., Rockwell International Corporation, Centralia, Ill., Budd Company, Madison Heights, Mich., and Eagle Picher Plastics, Grabill, Ind. The SRIM substrates suitable for the use include, but are not limited to, those provided by Bayer, Pittsburgh, Pa. Typical vinyl ester SMC substrates are manufactured by Dow, Midland, Mich. In a particular embodiment a suitable fiberglass reinforced thermoset substrate is a long fiber injection polyurethane (LFI-PU) foam.

In another embodiment the present invention provides methods for making multilayer articles comprising the layer components described herein. In some embodiments the coating layer comprising a block copolyestercarbonate and the second layer comprising a polymer comprising carbonate structural units are formed into a copolyestercarbonate/carbonate-comprising polymer pre-assembly comprising at least two layers. Such a pre-assembly can be made by known methods such as by coextrusion of films or sheets of the two materials. In other embodiments such a pre-assembly can be made by lamination, or solvent or melt coating. In a particular embodiment application of the coating layer to the second layer is performed in a melt process. Suitable methods for application include fabrication of a separate sheet of coating layer followed by application to the second layer, as well as simultaneous production of both layers. Thus, there may be employed such illustrative methods as molding, compression molding, thermoforming, co-injection molding, coextrusion, overmolding, multi-shot injection molding, sheet molding and placement of a film of the coating layer material on the surface of the second layer followed by adhesion of the two layers, typically in an injection molding apparatus; e.g., in-mold decoration. These operations may be conducted under art-recognized conditions.

Pre-assemblies comprising coating layer and second layer may comprise the combined thicknesses of the layers. Such a pre-assembly has a thickness in some embodiments in a range between about 10 microns and about 2500 microns; in other embodiments in a range between about 10 microns and about 1000 microns; in other embodiments in a range between about 10 microns and about 500 microns; and in still other embodiments in a range between about 10 microns and about 250 microns.

In some embodiments the polyurethane-comprising adhesive layer in a paste or low viscosity liquid form may be applied by methods known in the art, including, but not limited to, roller, brush, or spray with a wet film thickness of about 0.2 microns to about 1200 microns to a substrate. The copolyestercarbonate/carbonate-comprising polymer pre-assembly can then be formed adjacent to the adhesion layer upon the substrate layer by use of known methods, for example lamination using heat and pressure as in compression molding or using other forming techniques such as vacuum forming or hydroforming. Alternatively, polyurethane-comprising adhesive layer in a paste or low viscosity liquid form may be applied by methods known in the art to at least one side of said second layer either before or after formation of a pre-assembly of second layer with coating layer, followed by formation and bonding of the combined layers adjacent to the substrate layer. Alternatively, the said second layer can be formed adjacent to the substrate layer comprising a polyurethane adhesive, followed by formation of coating layer adjacent to the second layer. In any case where the viscosity ratio of certain adhesive layers and substrates are such that said adhesive layer cannot be evenly applied to said substrate layer (or vice versa), then a suitable difference in viscosities may be achieved by partially curing either of said substrate material or adhesive layer.

For polyurethane-comprising adhesive already in film form the multilayer article assembly may be formed by combining the various layers comprising coating layer, second layer, adhesive layer and substrate by methods known in the art. In one embodiment a copolyestercarbonate/carbonate-comprising polymer pre-assembly and separate adhesive layer may be combined by known methods with substrate layer to form the multilayer article assembly. Known methods include, but are not limited to, lamination and compression molding. Alternatively, the adhesive layer can be formed adjacent to the copolyestercarbonate/carbonate-comprising polymer pre-assembly either after or during a process (such as coextrusion) to make said pre-assembly, and become an integral part of the pre-assembly which can subsequently be directly formed adjacent to the substrate layer using known processes, for example by use of such methods as heat and pressure. Alternatively, said second layer can be formed adjacent to thermoplastic polyurethane adhesive film for example by directly coextruding said layers together, followed by formation of a pre-assembly with copolyestercarbonate coating layer using known methods which include, but are not limited to, extrusion coating, lamination and compression molding. Said pre-assembly can subsequently be directly formed adjacent to the substrate layer using known processes. The copolyestercarbonate/carbonate-comprising polymer pre-assembly can be optionally thermoformed to the approximate shape of the article before molding. In various embodiments any formation step of one layer adjacent to another layer may be performed by known methods which include, but are not limited to, extrusion coating, lamination and compression molding.

In one particular embodiment a multilayer article initially comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) a polyurethane-comprising adhesive layer, and (iv) a substrate layer comprising an uncured thermoset resin or an uncured cyclic oligomer, wherein the coating layer is in contiguous contact with the second layer, and the adhesive layer is in contiguous contact with the second layer and the substrate layer, may be prepared by a method comprising the step of assembling the coating layer, second layer, adhesive layer, and substrate by any known method to form an assembly. The final article is then prepared by a method which comprises subjecting the assembly to conditions under which the substrate material is cured by any known method. In some embodiments conditions under which the substrate material may be cured comprise subjecting the assembly to heat. In embodiments of the invention, after the substrate material is cured, the multilayer article exhibits a ninety-degree peel strength that is greater than that observed in a similar multilayer article made without tielayer. In other embodiments the multilayer article exhibits a ninety-degree peel strength of at least 700 Newtons per meter following curing of the substrate material. In still other embodiments the multilayer article exhibits a ninety-degree peel strength of at least 1750 Newtons per meter following curing of the substrate material.

It is also within the scope of the invention to apply a structure comprising the coating layer, second layer, and polyurethane-comprising adhesive layer to a substrate layer. This may be achieved by known methods, for example in one embodiment, by charging an injection mold with the structure comprising the coating layer, second layer, and polyurethane adhesive layer, and injecting the uncured substrate or substrate precursors behind it, accompanied by or followed by curing of the substrate-comprising assembly to form the final multilayer article. By this method, in-mold decoration and the like are possible. In one embodiment both sides of the substrate layer may receive the other layers, while in another embodiment they are applied to only one side of the substrate layer.

In some specific embodiments the multilayer article may be prepared by a method which is selected from the group consisting of the method (i) comprising the steps of (a) preparing a pre-assembly of coating layer and second layer, and (b) combining said pre-assembly with separate adhesive layer and substrate layer; the method (ii) comprising the steps of (a) preparing a pre-assembly of coating layer and second layer, (b) forming the adhesive layer adjacent to the substrate layer, and (c) combining said pre-assembly with the adhesive layer/substrate layer combination; and the method (iii) comprising the steps of (a) preparing a pre-assembly of coating layer, second layer, and adhesive layer, and (b) forming said pre-assembly adjacent to the substrate layer.

Following curing of the substrate material, the multilayer articles comprising the various layer components of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention. The multilayer articles often exhibit low internal thermal stress induced from CTE mismatch between layers. The multilayer articles may also possess excellent environmental stability, for example thermal and hydrolytic stability.

Following curing of the substrate material, multilayer articles which comprise the various layer components of this invention include articles for OVAD applications; exterior and interior components for aircraft, automotive, truck, military vehicle (including automotive, aircraft, and waterborne vehicles), scooter, and motorcycle, including panels, quarter panels, rocker panels, vertical panels, horizontal panels, trim, pillars, center posts, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; wind turbine blades and housings; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples the copolyestercarbonate-polycarbonate film pre-assembly comprised a layer of copolyestercarbonate film and a layer of polycarbonate film. The copolyestercarbonate film comprised a copolyestercarbonate with arylate structural units derived from unsubstituted resorcinol, isophthalic acid, and terephthalic acid, and carbonate structural units derived from bisphenol A. The polycarbonate film comprised bisphenol A polycarbonate. The abbreviation "PU" means polyurethane and "TPU" means thermoplastic polyurethane. The abbreviation "SMC" means sheet molding compound. The abbreviation "UPR" means unsaturated polyester resin.

The abbreviation "TSN" means thermoset NORYL, a material obtained from General Electric Plastics. TSN comprises a major amount of a polyphenylene ether and aminor amount of a vinyl monomer composition, along with various amounts of fillers, additives, and curing agents. The polyphenylene ether is preferably a poly(2,6-dimethyl-1,4-phenylene ether) (PPE) or poly(2,6-dimethyl-14-phenylene-co-2,3,6-trimethyl-1,4-phenylene ether), wherein greater than 5%, more preferably greater than 50%, most preferably greater than 90% of the polyphenylene ether hydroxyl groups have been capped. The capping group may contain acrylic, methacrylic or allylic functionality, and preferably methacrylic functionality. The polyphenylene ether may contain internal olefinic groups produced, for example, by reaction of internal repeat units with a alkenyl halide or alkenoyl halide or unsaturated carboxylic acid anhydride, such as allyl bromides, methacrylic acid halides, or methacrylic acid anhydrides. Such reaction may take place in the presence or absence of a basic reagent such as an amine or alkyl lithium reagent. The vinyl monomer composition comprises one or more monomers selected from the group consisting of a styrenic, acrylic and allylic monomer, preferably a blend of two or more of these monomers; more preferably a blend of a styrenic and an acrylic monomer; and most preferably a blend of styrene and a polyfunctional acrylate. TSN may contain from 0.5–95%, preferably 5–60% and most preferably 10–50% by weight polyphenylene ether. TSN may also contain from 95–0.5% by weight of a vinyl monomer composition. Such compositions may further contain other initiators; colorants; fillers, both polymeric, organic and inorganic; additives such as mold release agents; low profile additives; and the like. Inorganic fillers such as calcium carbonate are often included at levels of 0–250 parts by weight based on the TSN composition.

Various combinations possible in the thermoset NORYL composition are further described in U.S. Patent Application 20020028337.

Samples were cut into 2.5 centimeters (cm) wide stripes and tested for peel resistance of the polyurethane adhesive bond using a 90-degree peel test with a crosshead separation speed of 2.5 cm per minute using an Instron testing device (Model 4505). This adhesion test method is well known to those skilled in the art and is generally described in such references as U.S. Pat. No. 3,965,057. The testing apparatus in this test procedure consisted of a series of movable rollers or supports which allowed the test specimen to be peeled at a constant 90-degree angle along its entire uncut length. The apparatus consisted of a series of five 1.3 cm rollers which were geometrically affixed to two side supports and a base plate. The two lower rollers were adjustable so that the apparatus could accommodate test specimens varying in thickness. A suitable top clamp was used for securing the plastic layer. The test specimen was 15.2 cm in length and 2.5 cm in width. It was insured that a portion of the test specimen remained unbonded. At least 3 specimens were tested for each adhesive sample. In the actual testing procedure, the fixture was affixed to the movable head of the testing machine in a position which would cause the peeled plastic layer to form a 90-degree angle with the test specimen during the test. The test specimen was positioned in the fixture and the free skin clamped securely. The clamp was then pinned to the top head of the testing machine. With no load on the test specimen, the weighing apparatus was then balanced to zero. Provision was made to autograph the peel load versus displacement of the head for a peel distance of at least 10 cm. Neglecting the first 2.5 cm of peel, the load required to peel the plastic layer was taken from the autographic curve. The peel strength (P) was then calculated as follows:

$$P = \frac{\text{peeling load (Newtons)}}{\text{width of specimen (meters)}}.$$

EXAMPLE 1

Laminates were prepared by compression molding of copolyestercarbonate-polycarbonate film pre-assembly over UPR SMC with a TPU tielayer. A UPR SMC (grade MC-001669 SLI-269 from Meridian Auto Systems, Dearborn, Mis.) was used in this example. A 0.13 millimeter (mm) thick TPU film (grade UAF420) was obtained from Adhesive Films Inc, Pine Brook, N.J. A copolyestercarbonate-polycarbonate film pre-assembly was prepared by coextruding a 0.254 mm thick clear copolyestercarbonate film with a 0.5 mm thick pigmented polycarbonate layer. The copolyestercarbonate-polycarbonate film pre-assembly was put on top of about 600 grams of the SMC charge with the tielayer film placed between the SMC and the polycarbonate side of the copolyestercarbonate-polycarbonate film assembly. The entire assembly was placed in a compression molding press equipped with a 30.5 cm by 30.5 cm plaque mold. It was heated on both sides at 121° C. under 13.8 megapascals pressure for 8 minutes under vacuum to ensure the complete cure of the SMC. The molded article was then air cooled to room temperature. The copolyestercarbonate-polycarbonate film pre-assembly adhesion to the SMC was found to be excellent. The 90-degree peel strength was 4746 Newtons per meter (N/m). The failure mode was cohesive failure of the SMC substrate.

EXAMPLE 2

Laminates were prepared by compression molding of copolyestercarbonate-polycarbonate film pre-assembly over UPR SMC with a TPU tielayer A Class-A UPR SMC from Jet Moulding Compounds Inc., Ajax, Ontario, Canada, was used in this example. A copolyestercarbonate-polycarbonate film pre-assembly as in Example 1 was put on top of about 600 grams of the UPR SMC charge with the tielayer film as in Example 1 placed between the SMC and the polycarbonate side of the copolyestercarbonate-polycarbonate film assembly. The entire assembly was placed in a compression molding press equipped with a 15 cm diameter plaque mold. It was heated on both sides at 121° C. under 8.27 megapascals pressure for 8 minutes to ensure the complete cure of the SMC. The molded articles were then cooled to room temperature using a cold press under minimum pressure. The copolyestercarbonate-polycarbonate film pre-assembly adhesion to the SMC was found to be excellent. The 90-degree peel strength was 5079 N/m. The failure mode was cohesive failure of the SMC substrate.

EXAMPLE 3

Adhesion Environmental Stability Tests were performed. SMC multilayer structures were prepared as in Example 1 and subjected to a full cycle crack resistance test under varying conditions of temperature and humidity. Each full cycle involved holding the sample successively for 24 hours at 84° C., 16 hours at 38° C. and 98% relative humidity, 6 hours at minus 29° C., and 2 hours at 23° C. Each sample was subjected to 15 cycles. All samples were visually inspected after the full cycle crack test and were found to have no macroscopic delamination or other film-related failure. The treated samples were then cut into 2.5 cm by 20 cm test specimens for 90-degree peel test at 2.5 cm per minute crosshead separation speed. The measured peel strength was 4413 N/m. The failure mode was cohesive failure of SMC substrate. The result showed that adhesion provided to copolyestercarbonate-polycarbonate film pre-assembly by the TPU tielayer over uncured SMC, followed by curing, is environmentally stable, as adhesion strength remains excellent after the full cycle crack test protocol.

EXAMPLES 4–11

Multilayer articles were prepared comprising polycarbonate (PC) film over long fibber injection polyurethane (LFI-PU) foam. TPU films (grades UAF and TAF) were obtained from Adhesive Films Inc., Pine Brook, N.J.; Bemis TPU film (grade 3410) was obtained from Bemis Company, Minneapolis, Minn. The PC film and adhesive layers were laminated using a roll laminator to form a pre-assembly. The lamination of adhesive film and PC occurred at a nip point. The heat needed for lamination was either supplied by the heated rolls or by pre-heating the surfaces using infrared radiation. Molding experiments were conducted to evaluate the adhesion of several tielayers to both high-density (HD) and low-density (LD) PU foams. In all cases the PC-tielayer pre-assembly was placed in a mold cavity. Liquid streams comprising isocyanate and polyol were metered at high pressure through a mixing head and fed into the mold cavity along with chopped glass strands. All the PU foam formulations contained chopped glass (about 25 mm average length) and an internal mold release agent. The PU foam cured in the mold in an exothermic reaction. Addition of water to the formulation results in evolution of carbon dioxide gas and foamed product. As summarized in Table 1, a variety of TPU films provided excellent adhesion for PC film to cured PU foam, with the 90-degree peel strength value well above the value typically needed for automotive applications. In most cases, the peel failure mode was cohesive failure of PU foam substrates.

TABLE 1

| Example | Tie Layer | LFI-PU foam type | As-molded Peel Strength (N/m) | Failure Mode |
|---|---|---|---|---|
| 4 | UAF 420 | HD | 23,642 | Cohesive substrate and interfacial tie/substrate |
| 5 | Bemis 3410 | HD | 19,089 | Cohesive substrate and film tear |
| 6 | UAF 440 | HD | 10,858 | Cohesive substrate and interfacial tie/substrate |
| 7 | UAF 430 | LD | 6917 | Cohesive substrate |
| 8 | TAF 850 | LD | 6515 | Cohesive substrate |
| 9 | UAF 420 | LD | 4711 | Cohesive substrate |
| 10 | TAF 880 | LD | 4676 | Cohesive substrate |
| 11 | TAF 850 | LD | 4378 | Cohesive substrate |

EXAMPLE 12–19

Adhesion Environmental Stability Tests were performed. LFI-PU multilayer structures were prepared as in Example 4–11 and subjected to a full cycle crack resistance test under varying conditions of temperature and humidity as described for Example 3. All samples were visually inspected after the full cycle crack test and were found to have no macroscopic delamination or other film-related failure. The treated samples were then cut into 2.5 cm by 20 cm test specimens for 90-degree peel test at 2.5 cm per minute crosshead separation speed. The measured peel strength values are listed in Table 2. The results showed that adhesion provided to PC film over LFI-PU foam by the TPU tielayers is environmentally stable, as adhesion strength remains excellent after the full cycle crack resistance test protocol.

TABLE 2

| Example | Tie Layer | LFI-PU foam type | Peel Strength After Cycle Crack Test (N/m) |
|---|---|---|---|
| 12 | UAF 420 | HD | 16,175 |
| 13 | Bemis 3410 | HD | 9299 |
| 14 | UAF 440 | HD | 2930 |
| 15 | UAF 430 | LD | 7177 |
| 16 | TAF 850 | LD | 6397 |
| 17 | UAF 420 | LD | 4594 |
| 18 | TAF 880 | LD | 6958 |
| 19 | TAF 850 | LD | 7119 |

COMPARATIVE EXAMPLE 1

Multilayer articles comprising a polycarbonate film and either HD- or LD-LFI-PU PU substrate were prepared in the same manner as those in Examples 4–11 except that no tielayer was used. The polycarbonate film was found to have poor adhesion to either PU foam and delamination occurred in molded parts. A 90-degree peel test showed that the polycarbonate film adhesion to the PU foam was only about 350 N/m.

EXAMPLE 20

Laminates are prepared by compression molding of copolyestercarbonate-polycarbonate polycarbonate film pre-assembly over cyclic poly(1,4-butylene terephthalate) with a TPU tielayer. A TPU film (grade UAF420) is obtained from Adhesive Films Inc, Pine Brook, N.J. A copolyestercarbonate-polycarbonate film pre-assembly is prepared by coextruding a 0.254 mm thick clear copolyestercarbonate film with a 0.5 mm thick pigmented polycarbonate layer. The copolyestercarbonate-polycarbonate film pre-assembly is put on top of a charge comprising cyclic polyester and optionally a curing catalyst with the tielayer film placed between the cyclic polyester and the polycarbonate side of the copolyestercarbonate-polycarbonate film pre-assembly. The entire assembly is placed in a compression molding press equipped with a plaque mold. It is heated on both sides at a temperature and pressure and for a time sufficient to ensure the complete cure of the cyclic polyester. The molded article is then air cooled to room temperature. The copolyestercarbonate-polycarbonate film pre-assembly adhesion to the cured cyclic polyester is found to be higher than that for the corresponding comparative article made without tielayer as measured by the 90-degree peel test.

EXAMPLE 21

Laminates are prepared by compression molding of copolyestercarbonate-polycarbonate polycarbonate film pre-assembly over cyclic bisphenol A polycarbonate with a TPU tielayer. A TPU film (grade UAF420) is obtained from Adhesive Films Inc, Pine Brook, N.J. A copolyestercarbonate-polycarbonate film pre-assembly is prepared by coextruding a 0.254 mm thick clear copolyestercarbonate film with a 0.5 mm thick pigmented polycarbonate layer. The copolyestercarbonate-polycarbonate film pre-assembly is put on top of a charge comprising cyclic polycarbonate and optionally a curing catalyst with the tielayer film placed between the cyclic polycarbonate charge and the polycarbonate side of the copolyestercarbonate-polycarbonate polycarbonate film pre-assembly. The entire assembly is placed in a compression molding press equipped with a plaque mold. It is heated on both sides at a temperature and pressure and for a time sufficient to ensure the complete cure of the cyclic polycarbonate. The molded article is then air cooled to room temperature. The copolyestercarbonate-polycarbonate film pre-assembly adhesion to the cured cyclic polycarbonate is found to be higher than that for the corresponding comparative article made without tielayer as measured by the 90-degree peel test.

EXAMPLE 22

Laminates are prepared by compression molding of copolyestercarbonate-polycarbonate polycarbonate film pre-assembly over TSN with a TPU tielayer. A TPU film (grade UAF420) is obtained from Adhesive Films Inc, Pine Brook, N.J. A copolyestercarbonate-polycarbonate film pre-assembly is prepared by coextruding a 0.254 mm thick clear copolyestercarbonate film with a 0.5 mm thick pigmented polycarbonate layer. The copolyestercarbonate-polycarbonate film pre-assembly is put on top of a charge comprising TSN and optionally a curing catalyst with the tielayer film placed between the TSN charge and the polycarbonate side of the copolyestercarbonate-polycarbonate film pre-assembly. The entire assembly is placed in a compression molding press equipped with a plaque mold. It is heated on both sides at a temperature and pressure and for a time sufficient to ensure the complete cure of the TSN. The molded article is then air cooled to room temperature. The copolyestercarbonate-polycarbonate film pre-assembly adhesion to the cured TSN is found to be higher than that for the corresponding comparative article made without tielayer as measured by the 90-degree peel test.

EXAMPLE 23

Laminates are prepared by compression molding of copolyestercarbonate-polycarbonate polycarbonate film pre-assembly over epoxy resin with a TPU tielayer. A TPU film (grade UAF420) is obtained from Adhesive Films Inc, Pine Brook, N.J. A copolyestercarbonate-polycarbonate film pre-assembly is prepared by coextruding a 0.254 mm thick clear copolyestercarbonate film with a 0.5 mm thick pigmented polycarbonate layer. The copolyestercarbonate-polycarbonate film pre-assembly is put on top of a charge comprising an epoxy resin comprising structural units derived from bisphenol A, and optionally a curing catalyst with the tielayer film placed between the epoxy resin charge and the polycarbonate side of the copolyestercarbonate-polycarbonate film pre-assembly. The entire assembly is placed in a compression molding press equipped with a plaque mold. It is heated on both sides at a temperature and pressure and for a time sufficient to ensure the complete cure of the epoxy resin. The molded article is then air cooled to room temperature. The copolyestercarbonate-polycarbonate film pre-assembly adhesion to the cured epoxy resin is found to be higher than that for the corresponding comparative article made without tielayer as measured by the 90-degree peel test.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents, patent applications and published articles cited herein are incorporated herein by reference.

The invention claimed is:

1. A multilayer article assembly comprising (i) a coating layer comprising a block copolyestercarbonate comprising structural units derived from at 1,3-dihydroxybenzene and an aromatic dicarboxylic acid, (ii) a second layer comprising a polymer comprising carbonate structural units, (iii) an adhesive layer comprising a polyurethane, and (iv) an uncured thermoset or uncured cyclic oligomer substrate layer, wherein the coating layer is in contiguous contact with the second layer, and the adhesive layer is in contiguous contact with the second layer and the substrate layer.

2. The assembly of claim 1 wherein the coating layer comprises a 1,3-dihydroxybenzene selected from the group consisting of unsubstituted resorcinol, 2-methyl resorcinol, and mixtures thereof.

3. The assembly of claim 2 wherein the 1,3-dihydroxybenzene is unsubstituted resorcinol.

4. The assembly of claim 1 wherein the aromatic dicarboxylic acid is selected from the group consisting of isophthalic acid, terephthalic acid, naphthalene-2,6-dicarboxylic acid, and mixtures thereof.

5. The assembly of claim 4 wherein the aromatic dicarboxylic acid is a mixture of isophthalic acid and terephthalic acid.

6. The assembly of claim 5 wherein the ratio of isophthalic-derived structural units to terephthalic-derived structural units is about 0.25–4.0:1.

7. The assembly of claim 5 wherein the ratio of isophthalic-derived structural units to terephthalic-derived structural units is about 0.40–2.5:1.

8. The assembly of claim 1 wherein the copolyestercarbonate comprises about 10% to about 99% by weight arylate blocks.

9. The assembly of claim 1 wherein the copolyestercarbonate comprises about 60% to about 98% by weight arylate blocks.

10. The assembly of claim 1 wherein the carbonate portion of the copolyestercarbonate comprises structural units derived from bisphenol A.

11. The assembly of claim 1 wherein the second layer comprises a bisphenol A polycarbonate.

12. The assembly of claim 1 wherein the second layer further comprises a colorant selected from the group consisting of dyes, pigments, metal flakes, and glass flakes.

13. The assembly of claim 1 wherein the adhesive layer comprises a polyurethane comprising structural units derived from a polyol selected from the group consisting of polyether polyols, polyester polyols, polytetramethylene ether glycol, hexamethylene glycol and polyols based on polybutadiene.

14. The assembly of claim 13 wherein the polyurethane comprises structural units derived from methylene diphenyl diisocyanate or methylene biscyclohexyl diisocyanate.

15. The assembly of claim 1 wherein the polyurethane comprises an aliphatic polyurethane film.

16. The assembly of claim 1 wherein the adhesive layer comprises a block copolymer comprising a thermoplastic polyurethane block and a block comprising structural units derived from styrene.

17. The assembly of claim 16 wherein the block comprising structural units derived from styrene comprises a hydrogenated styrene-diene block.

18. The assembly of claim 1 wherein the substrate layer comprises a material selected from the group consisting of epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, isocyanates, cyclic polyester oligomers, cyclic poly(butylene terephthalate) oligomers, cyclic poly(ethylene terephthalate) oligomers, cyclic polycarbonate oligomers, cyclic bisphenol A polycarbonate oligomers, and cyclic polyetherimide oligomers.

19. The assembly of claim 18 wherein the substrate layer farther comprises a filler selected from the group consisting of glass fibers, carbon fibers, a thermoplastic resin, and mixtures thereof.

20. The assembly of claim 1 wherein the substrate layer comprises a filled material selected from the group consisting of reaction injection molding (RIM) compound, long fiber injection polyurethane (LFI-PU) foam, sheet-molding compound (SMC), bulk molding compound (BMC), thick molding compound (TMC), cyclic poly(butylene terephthalate) oligomers, cyclic bisphenol A polycarbonate oligomers, and an acrylic ester-derived thermoset resin comprising a polyphenylene ether.

21. The assembly of claim 1 wherein the multilayer article exhibits a ninety-degree peel strength of at least 700 Newtons per meter following curing of the substrate material.

22. The assembly of claim 21 wherein the multilayer article exhibits a ninety-degree peel strength of at least 1750 Newtons per meter following curing of the substrate material.

23. The assembly of claim 1 wherein thicknesses of layers are: a coating layer of about 2–2,500 microns; a second layer of about 2–2,500 microns; and an adhesive layer of about 8–2,500 microns.

24. The assembly of claim 1 which, following caring of the substrate layer, is an OVAD device; exterior or interior component for aircraft, automotive, truck, military vehicle; military automobile, military aircraft, military water-borne vehicle, scooter, motorcycle, including a panel, quarter panel, rocker panel, vertical panel, horizontal panel, trim, pillar, center post, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board; an enclosure, housing, panel, or part for outdoor vehicles and devices; a wind turbine blade or housing; an enclosure for an electrical or telecommunication device; outdoor furniture; aircraft component; exterior or interior component for a boat or item of marine equipment, including trim, an enclosure, or housing; an outboard motor housing; depth finder housing, personal water-craft; jet-ski; pool; spa; hot-tub; step; step covering; a building or construction application including glazing, roof, window, floor, decorative window furnishing or treatment; a treated glass cover for a pictures, paintings, poster, or display item; an optical lens; ophthalmic lens; corrective ophthalmic lens; implantable ophthalmic lens; a wall panel or door; a counter top; protected graphic; an outdoor or indoor sign; an enclosure, housing, panel, or part for an automatic teller machine (ATM); an enclosure, housing, panel, or part for a lawn or garden tractor, lawn mower, or tool, including a lawn or garden tool; window or door trim; an item of sports equipment or a toy; an enclosure, housing, panel, or part for a snowmobile; a recreational vehicle panel or component; an item of playground equipment; an article made from plastic-wood combinations; a golf course marker; a utility pit cover; a computer housing; a desk-top computer housing; a portable computer housing; a lap-top computer housing; a palm-held computer housings; a monitor housing; a printer housing; a keyboard; a FAX machine housing; a copier housing; a telephone housing; a phone bezel; a mobile phone housing; a radio sender housing; a radio receiver housing; a light fixture; lighting appliance; reflector; network interface device housing; transformer housing; air conditioner housing; cladding or seating for public transportation; cladding or seating for a train, subway, or bus; a meter housing; antenna housing; cladding for satellite dishes; an coated helmet or item of personal protective equipment; a coated synthetic or natural textile; coated photographic film or photographic print; a coated painted article; coated dyed article; coated fluorescent article; or coated foam article.

25. A multilayer article assembly comprising (i) a coating layer comprising a block copolyestercarbonate comprising structural units derived from unsubstituted resorcinol, a mixture of isophthalic acid and terephthalic acid, and bisphenol A; (ii) a second layer comprising a bisphenol A polycarbonate optionally containing a colorant, (iii) an adhesive layer selected from the group consisting of a polyurethane, an aliphatic polyurethane film, and a block copolymer comprising a thermoplastic polyurethane block and at least one block comprising structural units derived from styrene, and (iv) a substrate layer selected from the group consisting of an uncured thermoset resin and an uncured cyclic oligomer;

wherein the coating layer is in contiguous contact with the second layer, and the adhesive layer is in contiguous contact with the second layer and the substrate layer; and wherein the multilayer article assembly following curing of the substrate material exhibits a ninety-degree peel strength of at least 700 Newtons per meter.

26. A method for making a multilayer article assembly comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive layer comprising a polyurethane, and (iv) an uncured thermoset or uncured cyclic oligomer substrate layer, wherein the coating layer is in contiguous contact with the second layer, and the adhesive layer is in contiguous contact with the second layer and the substrate layer;

which method is selected from the group consisting of
the method comprising preparing a pre-assembly of coating layer and second layer, and combining said pre-assembly with separate adhesive layer and substrate layer;
the method comprising preparing a pre-assembly of coating layer and second layer, forming the adhesive layer adjacent to the substrate layer, and combining said pre-assembly with the adhesive layer/substrate layer combination; and
the method comprising preparing a pre-assembly of coating layer, second layer, and adhesive layer, and forming said pre-assembly adjacent to the substrate layer.

27. The method of claim 26 wherein the pre-assembly of coating layer and second layer is formed by coextrusion.

28. The method of claim 26 wherein forming said pre-assembly adjacent to the adhesive layer is performed by extrusion coating, lamination or compression molding.

29. The method of claim 26 wherein the coating layer comprises at least one 1,3-dihydroxybenzene selected from the group consisting of unsubstituted resorcinol, 2-methyl resorcinol, and mixtures thereof.

30. The method of claim 29 wherein the 1,3-dihydroxybenzene is unsubstituted resorcinol.

31. The method of claim 26 wherein the aromatic dicarboxylic acid is selected from the group consisting of isophthalic acid, terephthalic acid, naphthalene-2,6-dicarboxylic acid, and mixtures thereof.

32. The method of claim 31 wherein the aromatic dicarboxylic acid is a mixture of isophthalic acid and terephthalic acid.

33. The method of claim 32 wherein the ratio of isophthalic-derived structural units to terephthalic-derived structural units is about 0.25–4.0:1.

34. The method of claim 32 wherein the ratio of isophthalic-derived structural units to terephthalic derived structural units is about 0.40–2.5:1.

35. The method of claim 26 wherein the copolyestercarbonate comprises about 10% to about 99% by weight arylate blocks.

36. The method of claim 26 wherein the copolyestercarbonate composes about 60% to about 98% by weight arylate blocks.

37. The method of claim 26 wherein the carbonate portion of the copolyestercarbonate comprises structural units derived from bisphenol A.

38. The method of claim 26 wherein the second layer comprises a bisphenol A polycarbonate.

39. The method of claim 26 wherein the second layer further comprises a colorant selected from the group consisting of dyes, pigments, metal flakes, and glass flakes.

40. The method of claim 26 wherein the adhesive layer comprises a polyurethane comprising structural units derived from at least one polyol selected from the group consisting of polyether polyols, polyester polyols, polytetramethylene ether glycol, hexamethylene glycol and polyols based on polybutadiene.

41. The method of claim 40 wherein the polyurethane comprises structural units derived from methylene diphenyl diisocyanate or methylene biscyclohexyl diisocyanate.

42. The method of claim 26 wherein the polyurethane comprises an aliphatic polyurethane film.

43. The method of claim 26 wherein the adhesive layer comprises a block copolymer comprising a thermoplastic polyurethane block and a block comprising structural units derived from styrene.

44. The method of claim 43 wherein the block comprising structural units derived from styrene comprises a hydrogenated styrene-diene block.

45. The method of claim 26 wherein the substrate layer comprises a material selected from the group consisting of epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, isocyanates, cyclic polyester oligomers, cyclic poly(butylene terephthalate) oligomers, cyclic poly(ethylene terephthalate) oligomers, cyclic polycarbonate oligomers, cyclic bisphenol A polycarbonate oligomers, and cyclic polyetherimide oligomers.

46. The method of claim 45 wherein the substrate layer further comprises a filler selected from the group consisting of glass fibers, carbon fibers, a thermoplastic resin, and mixtures thereof.

47. The method of claim 26 wherein the substrate layer comprises a filled material selected from the group consisting of sheet-molding compound (SMC), bulk molding compound (BMC), thick molding compound (TMC), cyclic poly(butylene terephthalate) oligomers, cyclic bisphenol A polycarbonate oligomers, and an acrylic ester-derived thermoset resin comprising a polyphenylene ether.

48. The method of claim 26 wherein the multilayer article exhibits a ninety-degree peel strength of at least 700 Newtons per meter following curing of the substrate material.

49. The method of claim 48 wherein the multilayer article exhibits a ninety-degree peel strength of at least 1750 Newtons per meter following curing of the substrate material.

50. The method of claim 26 wherein thicknesses of layers are a coating layer of about 2–2,500 microns; a second layer of about 2–2,500 microns; and an adhesive layer of about 8–2,500 microns.

51. A method for making a multilayer article assembly comprising (i) a coating layer comprising a block copolyestercarbonate comprising structural units derived from unsubstituted resorcinol, a mixture of isophthalic acid and terephthalic acid, and bisphenol A; (ii) a second layer comprising a bisphenol A polycarbonate optionally containing a colorant, (iii) an adhesive layer selected from the group consisting of a polyurethane, an aliphatic polyurethane film, and a block copolymer comprising a thermoplastic polyurethane block and at least one block comprising structural units derived from styrene, and (iv) a substrate layer selected from the group consisting of an uncured thermoset resin and an uncured cyclic oligomer;

wherein the coating layer is in contiguous contact with the second layer, and the adhesive layer is in contiguous contact with the second layer and the substrate layer; and wherein the multilayer article assembly following curing of the substrate material exhibits a ninety-degree peel strength of at least 700 Newtons per meter, which method is selected from the group consisting of the method comprising preparing a pre-assembly of coating layer and second layer, and combining said pre-assembly with separate adhesive layer and substrate layer;

the method comprising preparing a pre-assembly of coating layer and second layer, forming the adhesive layer adjacent to the substrate layer, and combining said pre-assembly with the adhesive layer/substrate layer combination; and the method comprising preparing a pre-assembly of coating layer, second layer, and adhesive layer, and forming said pre-assembly adjacent to the substrate layer.

52. The assembly of claim 1 which, following curing of the substrate layer, is an aircraft component, an automotive component, a truck component, a military vehicle component, recreatioual vehicle component, a tractor component, a lawn mower component, a garden tool, a wind turbine blade, a wind turbine housing, an enclosure, outdoor furniture, marine equipment, a pool, a spa, a hot-tub, a step, a step covering, a building application, a tmated glass cover, an optical lens, an ophthalmic lens, a wall panel, a door, a counter top, protected graphic, a sign, an automatic teller machine component, trim, sports equipment, a toy, playground equipment; a plastic-wood article, a golf course marker, a utility pit cover, a keyboard, a phone bezel, a light fixture, a lighting appliance, a reflector, cladding for public transportation, seating for public transportation, cladding for satellite dishes, a personal protective equipment component, a coated textile, a coated photographic film, a coated photographic print, a coated painted article, coated dyed article, coated fluorescent article, or coated foam article.

53. The assembly of claim 52 which, following ewing of the substrate layer, is a snowmobile component, or a boat component.

54. The assembly of claim 52 which, following curing of the substrate layer, is the enclosure which is selected from the group consisting of a computer housing, a monitor housing, a printer housing, a FAX machine housing, a copier housing, a telephone housing, a mobile phone housing, a radio sender housing, a radio receiver housing, a network interface device housing, a transformmer housing, an air conditioner housing, a meter housing, and an antenna housing.

55. A multilayer article assembly comprising (i) a coaling layer comprising a block eopolyestercarbonate comprising structural units derived from a 1,3-dihydroxybenzene and an aromatic dicarboxylic acid, (ii) a second layer comprising a polymer comprising carbonate structural units, (iii) an adhesive layer comprising a polyurethane, and (iv) an uncured thermoset substrate layer, wherein the coating layer is in contiguous contact with the second layer, and the adhesive layer is in contiguous contact with the second layer and the substrate layer.

56. A multilayer article assembly comprising (i) a coating layer comprising a block copolyestercarborinte comprising structural units derived from a 1,3-dihydroxybenzene and a aromatic dicarboxylic acid, (ii) a second layer comprising a polymer comprising carbonate structural units, (iii) an adhesive layer comprising a polyurethane, and (iv) an uncured cyclic oligomer substrate layer, wherein the coating layer is in contiguous contact with the second layer, and the adhesive layer is in contiguous contact with the second layer and the substrate layer.

* * * * *